(12) United States Patent
Bailey

(10) Patent No.: US 9,915,411 B2
(45) Date of Patent: Mar. 13, 2018

(54) OPEN LIGHT FLOW OPTICS

(71) Applicant: Edward E. Bailey, Westampton, NJ (US)

(72) Inventor: Edward E. Bailey, Westampton, NJ (US)

(73) Assignee: Illumination Machines, LLC, Morrisville, NC (US)

( * ) Notice: Subject to any disclaimer, the term of this patent is extended or adjusted under 35 U.S.C. 154(b) by 0 days.

(21) Appl. No.: 14/526,485

(22) Filed: Oct. 28, 2014

(65) Prior Publication Data

US 2015/0117014 A1    Apr. 30, 2015

Related U.S. Application Data

(60) Provisional application No. 61/896,356, filed on Oct. 28, 2013.

(51) Int. Cl.

| | |
|---|---|
| *F21V 13/04* | (2006.01) |
| *G02B 27/30* | (2006.01) |
| *F21V 5/04* | (2006.01) |
| *F21V 5/00* | (2018.01) |
| *G02B 19/00* | (2006.01) |
| *F21V 7/00* | (2006.01) |

(52) U.S. Cl.
CPC .............. *F21V 13/04* (2013.01); *F21V 5/002* (2013.01); *F21V 5/004* (2013.01); *F21V 5/043* (2013.01); *F21V 5/045* (2013.01); *F21V 5/046* (2013.01); *G02B 19/0028* (2013.01); *G02B 19/0061* (2013.01); *G02B 27/30* (2013.01); *F21V 7/0091* (2013.01)

(58) Field of Classification Search
CPC .......... F21V 5/002; F21V 5/004; F21V 5/043; F21V 5/045; F21V 7/0091; F21V 13/04; F21V 5/046; G02B 19/0028; G02B 19/0061; G02B 27/30

See application file for complete search history.

(56) References Cited

U.S. PATENT DOCUMENTS

| | | | | |
|---|---|---|---|---|
| 7,431,480 | B2* | 10/2008 | Godo | F21V 5/04 362/311.06 |
| 7,918,583 | B2* | 4/2011 | Chakmakjian | F21V 5/007 362/237 |
| 8,033,681 | B2* | 10/2011 | Brass | F21L 4/00 362/202 |
| 8,075,165 | B2* | 12/2011 | Jiang | F21V 5/04 362/249.02 |
| 8,770,793 | B2* | 7/2014 | Mizuta | F21K 9/137 362/249.02 |
| 8,944,660 | B2* | 2/2015 | Hukkanen | G02B 3/08 362/607 |
| 2009/0128921 | A1* | 5/2009 | Roth | F21V 5/04 359/641 |
| 2010/0177495 | A1* | 7/2010 | Van Oers | F21V 5/04 362/84 |
| 2011/0096553 | A1* | 4/2011 | Shimokawa | F21V 5/04 362/311.02 |
| 2013/0258663 | A1* | 10/2013 | Woodgate | F21K 9/00 362/236 |

* cited by examiner

*Primary Examiner* — Alan Cariaso
(74) *Attorney, Agent, or Firm* — White-Welker & Welker, LLC; Matthew T. Welker, Esq.

(57) ABSTRACT

High efficiency optical collimator utilizing an open central light flow feature reduces losses while maintaining high intensity. Many degrees of collimation are possible including wide beam angles which traditionally exhibit high back-reflection losses.

18 Claims, 15 Drawing Sheets

OPEN LIGHT FLOW OPTICS

CROSS REFERENCE TO RELATED APPLICATIONS

This application claims priority from U.S. Provisional Patent Application Ser. No. 61/896,356, entitled "Open Light Flow Optics", filed on 28 Oct. 2013. The benefit under 35 USC § 119e of the U.S. provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to optical collimators. More specifically, the present invention relates to a high efficiency optical collimator utilizing an open central light flow feature reduces losses while maintaining high intensity.

BACKGROUND OF THE INVENTION

Antiquated incandescent, halogen cycle, and mercury vapor lighting devices do not provide the color stability, and luminous efficacy to reduce carbon emissions. Solid-state devices such as light emitting diodes produce light at much higher efficacy. Such devices produce light in a Lambertian 180 deg distribution which requires optical control to reduce glare and to increase light on the task or work surface.

SUMMARY OF THE INVENTION

In the past optics for solid-state lighting devices failed to produce narrow-beam collimation at efficiencies >94%, due to central zone Fresnel losses, limited vacuum metalized coating reflectance, or due to internal material absorption losses. Producing high intensity light by means of parabolic and semi-parabolic reflectors results in spill light produced by the light rays which do not strike the top of reflecting surfaces. To collimate more of the light emerging from the central zone a novel light collimator utilizing an inward sloped refractor may pull more of this light laterally for collimation by means of a TIR or totally-internally reflecting lens surface. Although a small percentage of the light which emerges from narrow angles in the central zone is not collimated by the open architecture of the optic, the degree of spill light is reduced, the total material volume of the optic decreased, and the total light transfer efficiency increased.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings where like numbers represent like elements, which form a part hereof, and in which is shown by way of illustration specific exemplary embodiments disclosing how the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the Figures, it is possible to see the various major elements constituting the apparatus of the present invention. The enclosed Figure drawings are intended to illustrate the open light flow optics.

Figure 1:
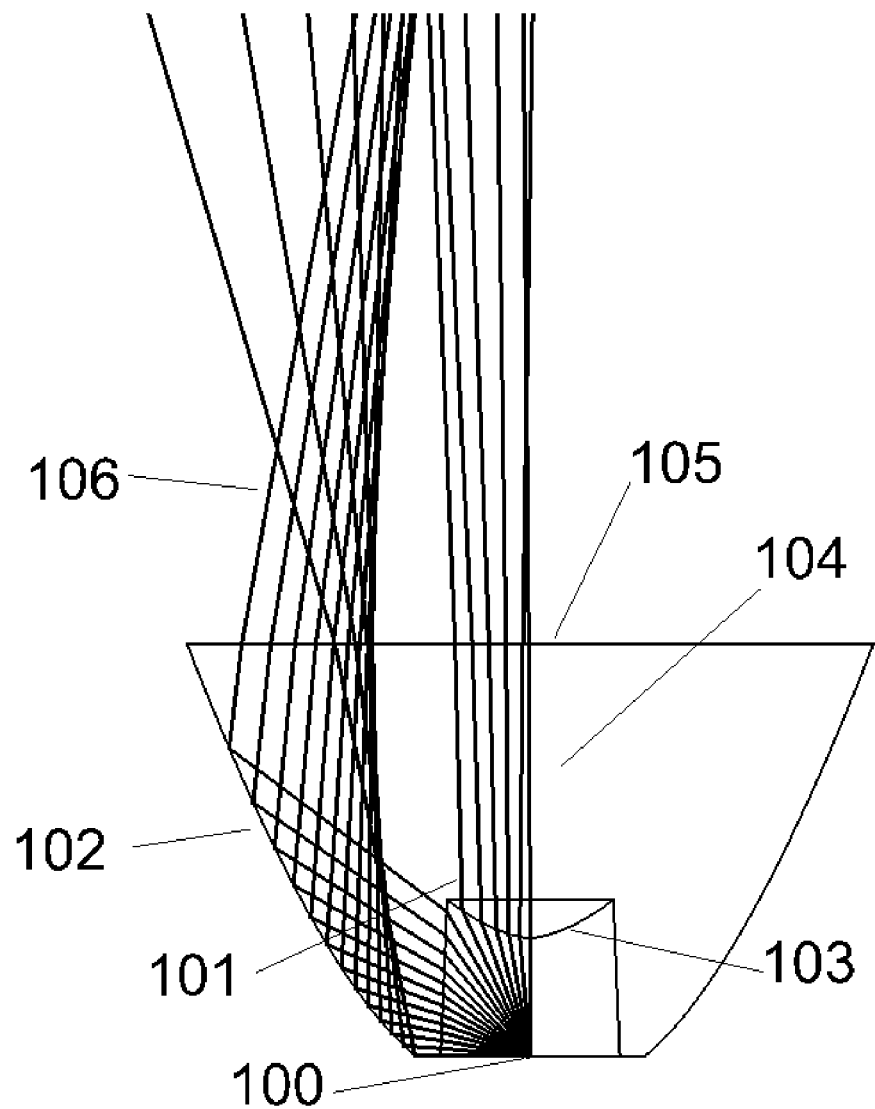
FIG. 1 illustrates a prior art TIR collimator utilizing inward facing convex lens.

FIG. 1 depicts prior art pertaining to the light ray paths emerging from a solid state lighting source 100, in which the central ray fan 101 passes through a convex lens with radius of curvature facing the light source 100, resulting in higher collimated light through the exit face 105. The light ray fan striking the TIR or total internally reflecting surface 102 transforms light which initially passes internally in a lateral direction through the transparent dielectric to a forward direction. The light energy depicted by rays 106 may emerge with collimated direction cosines, or with light divergence as required—produced by control surface 102. The large thickness of dielectric material 104 requires extended time for molding, and sink marks at the center of exit surface 105 are common. When passing through the thickness of material 104 light absorption is increased, and typical optical light transfer efficiency does not exceed 90% when including Fresnel losses.

Figure 2:
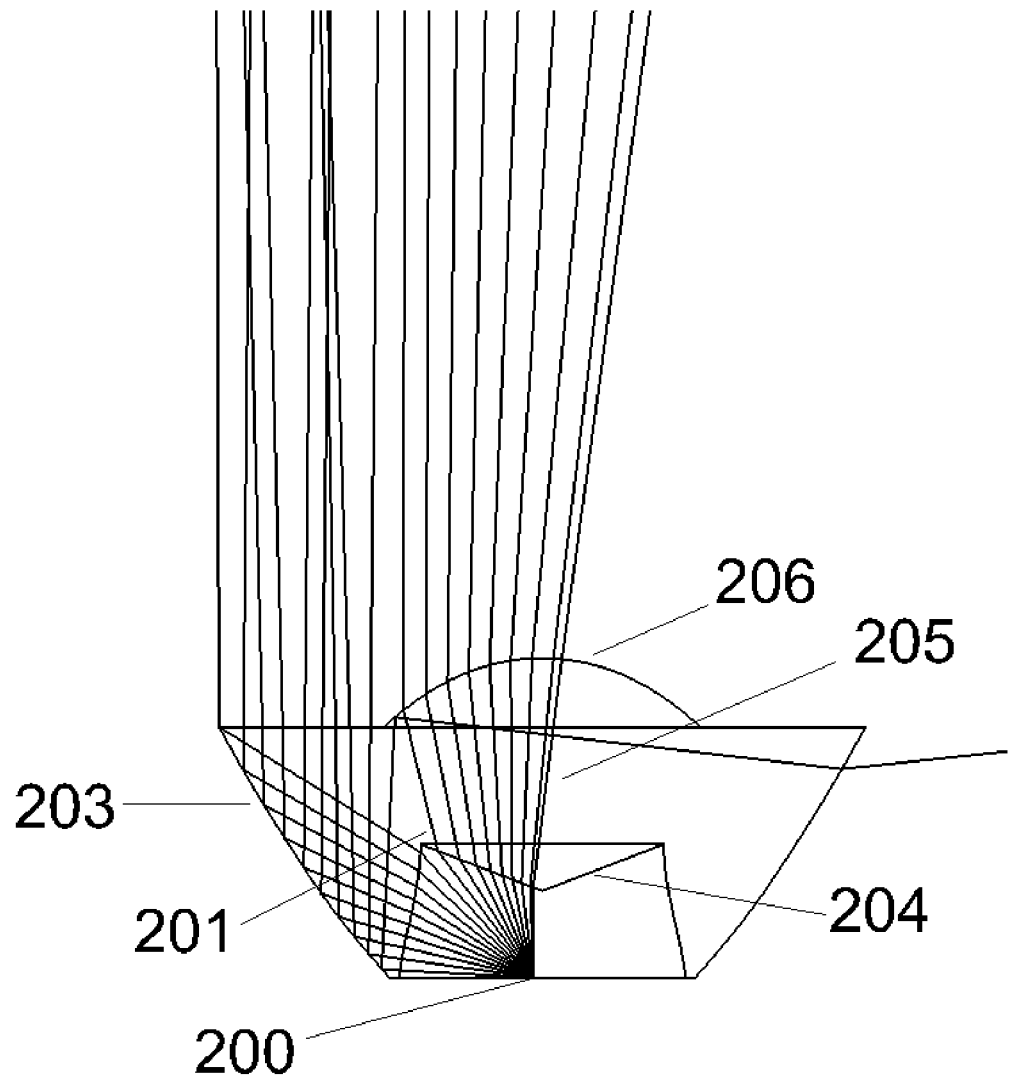
FIG. 2 illustrates a prior art compact TIR collimator.

FIG. 2 depicts a prior art compact collimator for a solid-state light source 200, which transforms the upward light ray energy and lateral light energy into high intensity light. The major light control surfaces which produce transformation on the direction of the light energy emerging from source 200, include the high conic constant triangular convex surface 204 which works in tandem with the outwardly convex collimator surface 206 to produce collimated light. The light 201 emerging after initial refraction control by the triangular surface 204 passes through dielectric material 205. The tandem use of lenses 204 and 206 results in a more compact collimator than the FIG. 1 collimator. The light source 200 produces light in a Lambertian 180 deg distribution which splits into light fans 201 and a lateral fan which collimates upward by means of TIR surface 203. One of the issues with such compact collimators is the number of sharp flat or semi-flat spline to convex surface intersections. Light energy scatters at these interfaces producing more backward direction loss and absorption.

Figure 3:
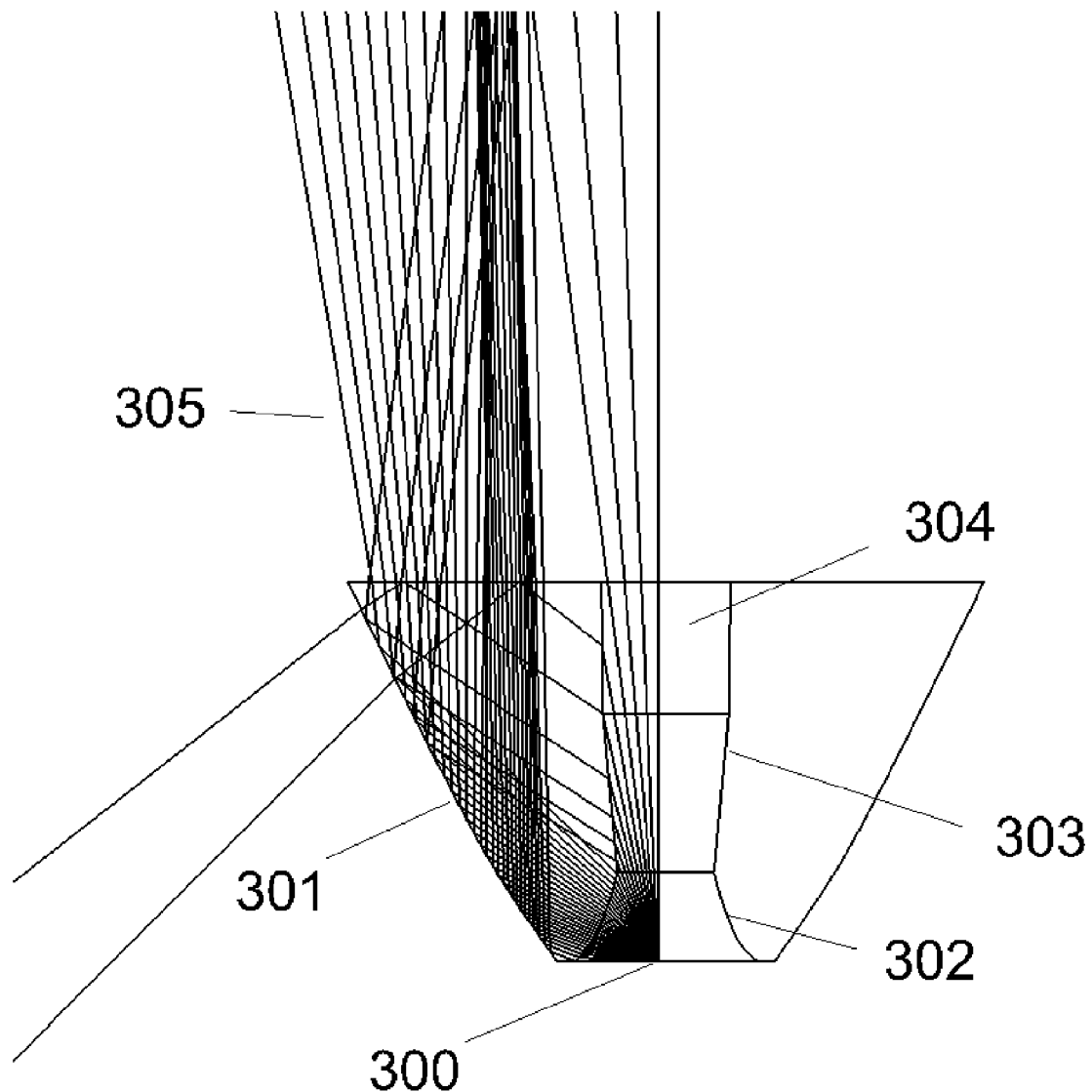
FIG. 3 illustrates an open narrow light flow optic spline design.

FIG. 3 displays the light energy control produced by a novel optic with an open light flow feature 304. An open light flow feature 304 allows light within a restricted distribution zone to pass uninhibited through the core of the collimator. Many solid state light sources are comprised of a violet or blue light emitting diode which pumps a thin phosphor layer to produce white light. Within the central intensity distribution of the light produced by the solid-state light source the CCT or correlated color temperature is cooler in white appearance i.e. bluer than the edges.

Color mixing features are usually applied to the top surface of TIR collimators to mix the light to a uniform white within the beam and field. Although the light emerging through the open light flow core 304 is not collimated the free flow is restricted to only cover the beam of the light on task surface, whereas in other prior art optics the central zone of light is collimated by a convex collimator as in FIG. 1, and then dispersed again by a lenslet diffuser at the top surface. As the percentage of light passing through the core is collimated and then dispersed again after passing through an absorbing transparent dielectric the utility is limited. The light source 300 may produce a Lambertian distribution which is controlled by refractive optical control surface 302.

Although the central zone of light from 0-5 deg may pass unimpeded through the open light flow feature 304, some light from 6-10 deg may inwardly refract by means of surface 303 before undergoing TIR reflection upward by means of TIR surface 301. The exiting light 305 emerging by means of control via TIR surface 301 may be collimated to a high degree i.e. 5-10 deg beam, or more weakly collimated to a 25-40 deg medium flood. The optical efficiency of the open TIR optic is typically 93-95%, produces collimation similar to a metallic reflector, but has more collimation due to the light control provided by surface 302. An open light flow optic also has fewer problems with sink marks at the top surface, and can have 2 to 3× faster mold cycle time, thereby reducing the cost.

Figure 4:
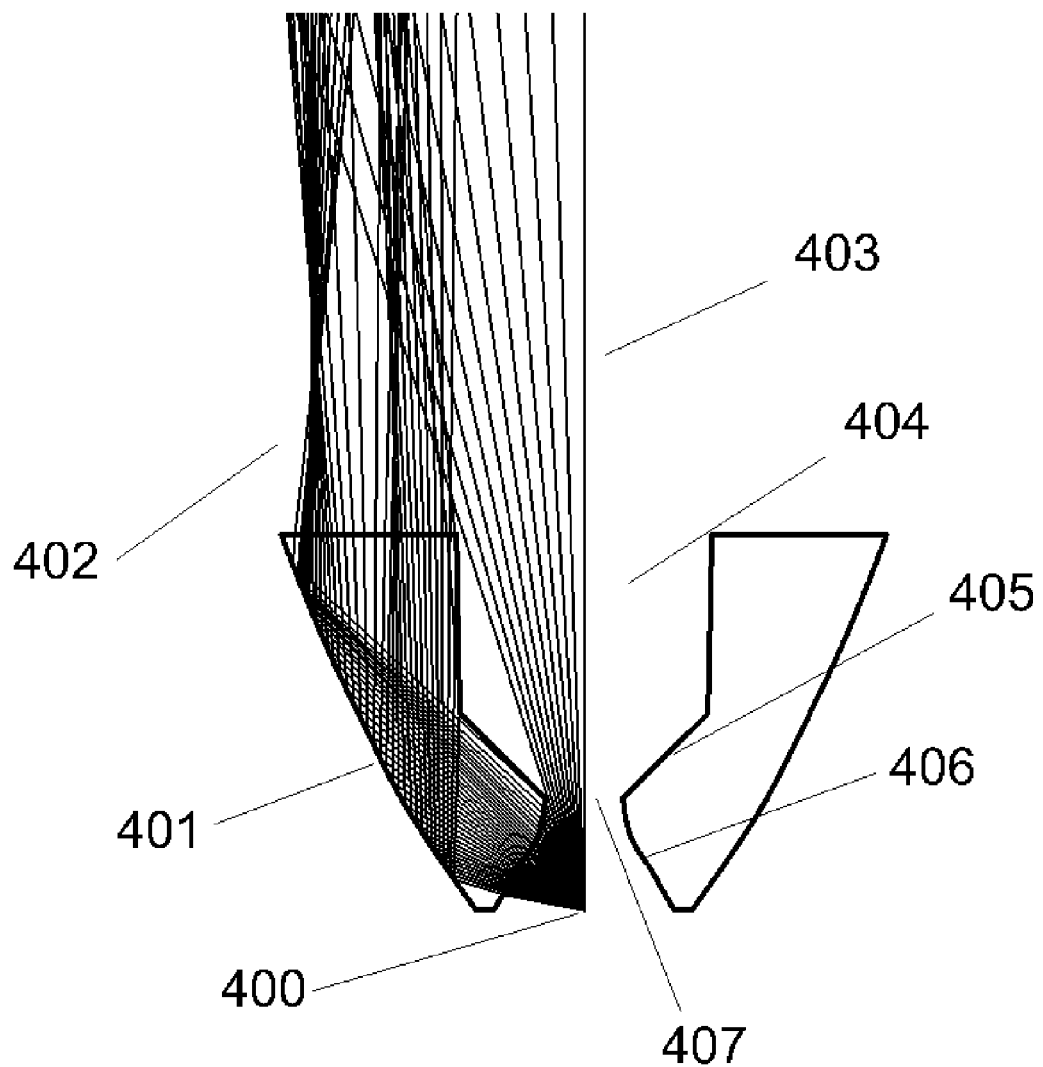
FIG. 4 illustrates an open narrow beam light flow optic.

FIG. 4 depicts an enhanced open light flow optic with more aggressive material reduction which utilizes a refraction control surface 406 very close to the light source 400. Light emerges unimpeded through the open light flow feature 407 before passing through air section 404 to exit. Light produced laterally 30-90 deg from light source 400 is controlled and collimated by means of TIR surface 401. The resulting light beam 403 disperses uniformly to cover the majority of the light energy 402 producing high intensity light. The material volume of the transparent dielectric is 30% that of FIG. 1, but produces similar collimation performance and lower cycle time. Transparent materials which may be used include pmma, polycarbonate, silicone and glass. Control surface 405 may also be used to pull light back into the dielectric for collimation.

Figure 5:
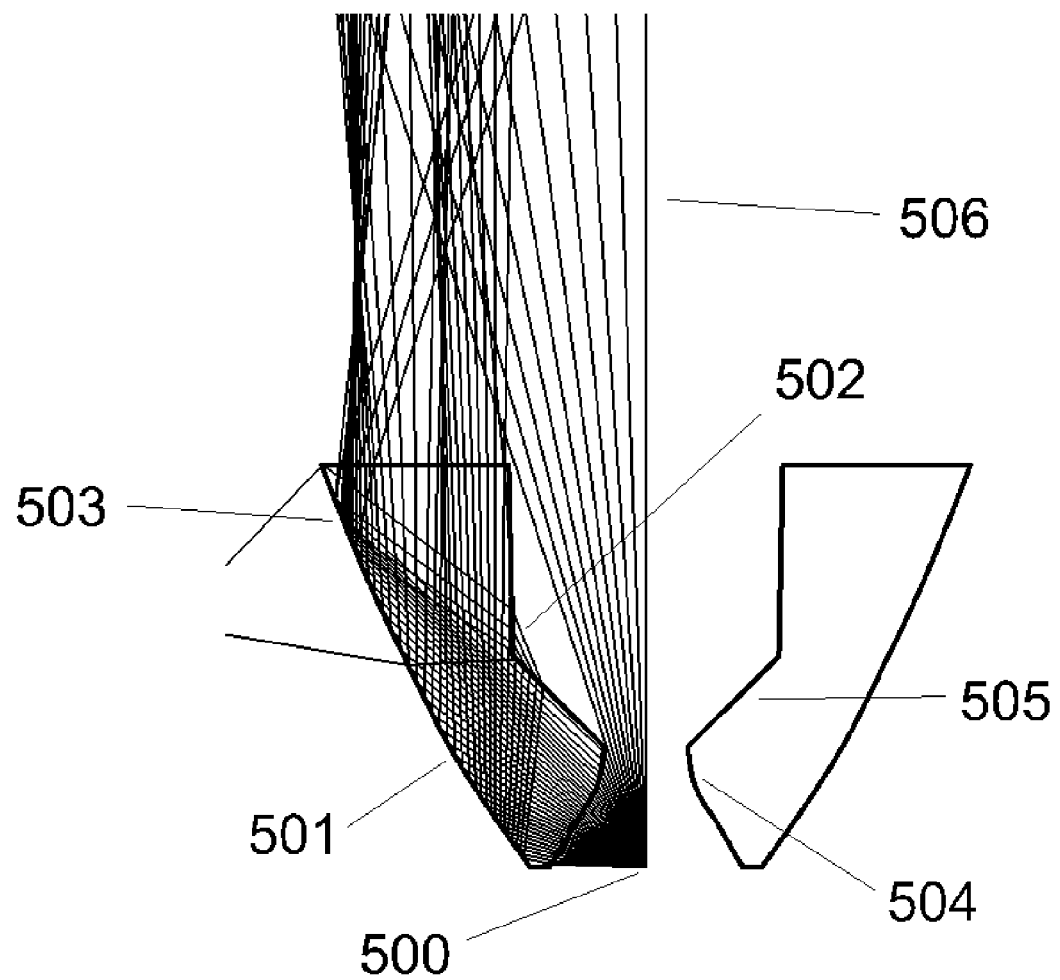
FIG. 5 illustrates an open narrow beam light flow optic with secondary refractor.

FIG. 5 changes the light control profiles of the open light flow optic depicted in FIG. 4. Light produced by solid-state light source 500 refracts into a light guide section before control by TIR surface 501. TIR surface 501 performs two functions both collimated light as well as inwardly directing light for control by means of surface 505. As can be shown a percentage of light 502 passes through air before re-entering the optic for collimation near the TIR control section 503. Surface 503 provides further collimation and results in higher intensity of light 506. Light control surface 505 which provides secondary control upon light directed upward and inward by means of TIR surface 501, may be a straight section, or may have more complex curvature or discrete sections of variable slope. The open retains the features of open light flow architecture including high efficiency >93%, and substantial collimation efficiency or candela/lumen while using less material.

Figure 6:
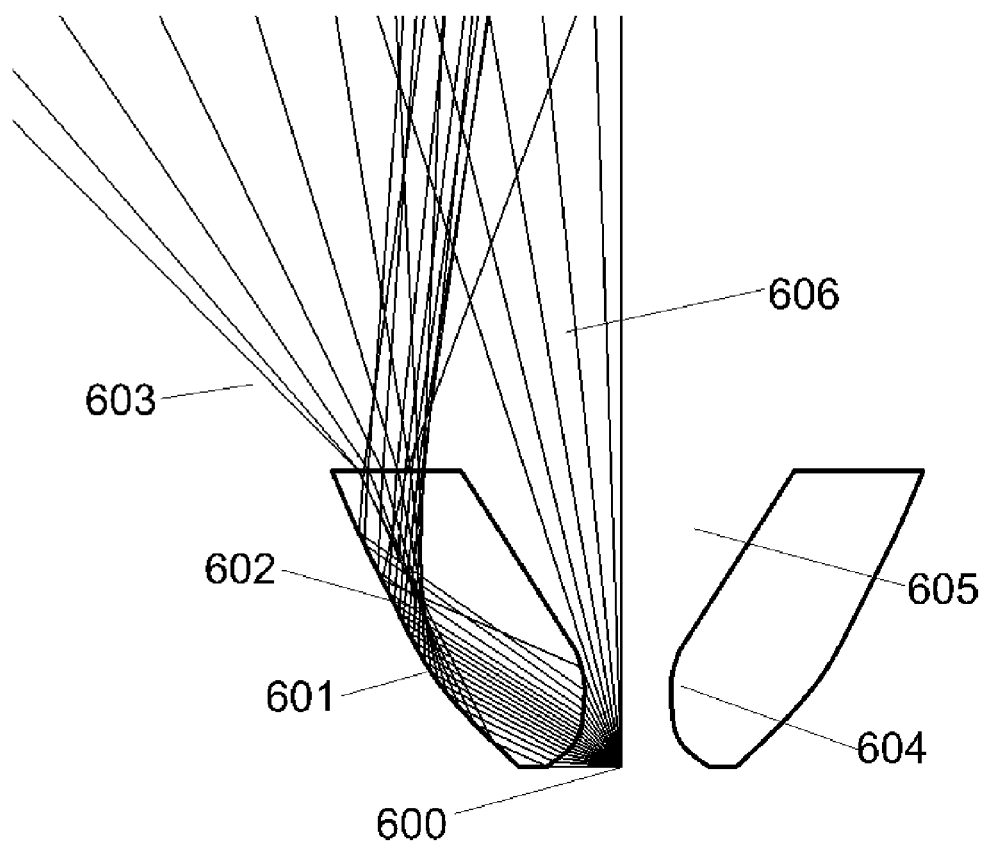
FIG. 6 illustrates a high efficiency open medium beam light flow optic.

FIG. 6 shows a medium beam open light flow optic which produces a 25 deg beam at 94% efficiency. The light source 600 is first collimated laterally by refractor surface 604 before collimation by means of TIR surface 601 with a secondary TIR spline 602 controlling the light. The open section 605 allows light to pass unimpeded by Fresnel back reflection or by lenslet diffusers. Most 25-35 deg optics utilize aggressive lenslet diffusers to homogenize and spread out the light from the source which at best can only achieve 87-90 percent light transfer efficiency. The two resultant light beams 606 and 603 which emerge by first passing through open light flow 605 and the second by means of a TIR/refractor combination 604, 601, 602 produce pleasing Gaussian intensity distribution free of striations and artifacts while using far less dielectric material.

Figure 7:
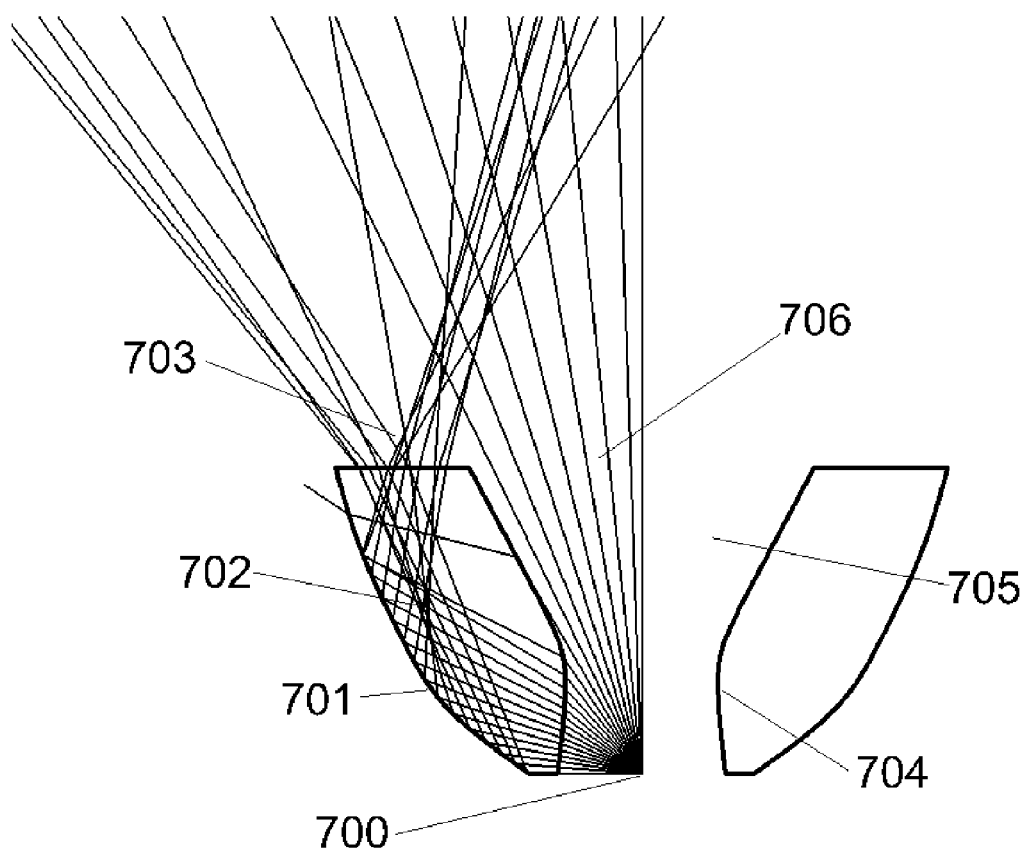
FIG. 7 illustrates a high efficiency open wide beam light flow optic.

FIG. 7 shows a 50 deg open light flow optical collimator which transforms light from a Lambertian distribution source 700 into a wide flood at high efficiency >94%. The open light flow (OLF) optic utilizes the following light control surface to accomplish wide flood collimation including a refractor surface 704 which transforms light within the 50-90 deg zones into laterally collimated light which strikes TIR control surface 701. An intermediate caustic is produced near zone 702 which represents in some features a CEC or confocal elliptic concentrator with a 45 deg tilt from a reference ray emerging upward from source 700 with a directional vector of xyz [0,0,1]. Light flow through the open air feature 705 continues unimpeded by a convex collimator+lossy dielectric+lenslet diffuser. The distribution depicted by the splitting of light ray fans at 703 allows for the production of flatter field super Gaussian beams to light with more spill, field light with depressed central intensity i.e. "bat-wing" distribution as required by lighting application.

The primary novel features of the open light flow optic include lower material volume, lower cycle time, and higher efficiency than most prior art optics.

Figure 8:
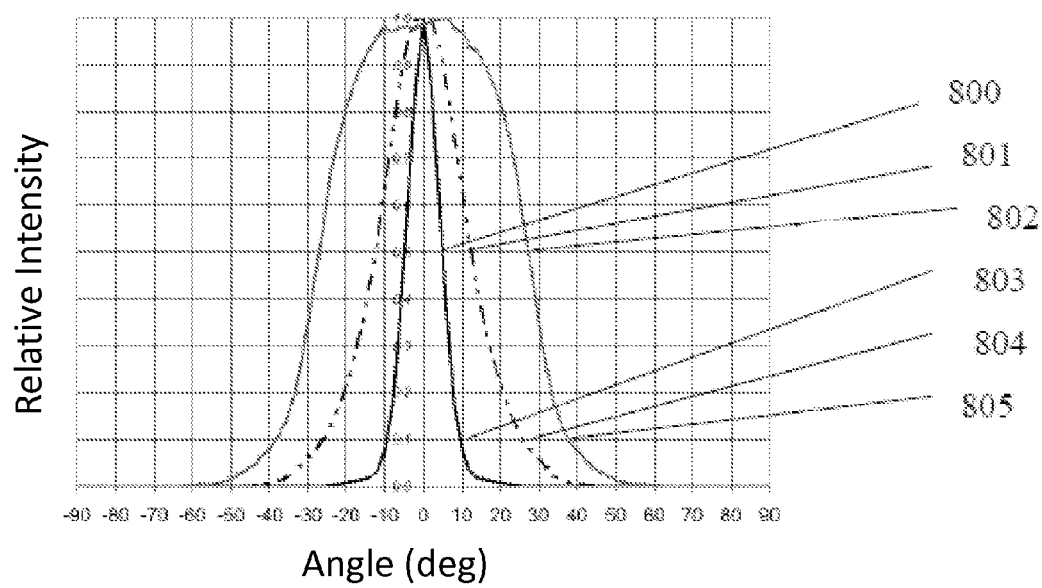
FIG. 8 illustrates a narrow, medium, wide light flow optical intensity distribution.

FIG. 8 shows the light distribution charts of the optics embodiments comprising FIGS. 5, 6, 7. Light distribution can be characterized by the beam and the field. The beam of a light is the full distribution angle at which the light intensity is 50% of the peak. The field is the full distribution angle at which the intensity is 10% of the peak. The ratio of the beam to the field represents the edge of the light distribution. With unity beam/field representing a perfectly sharp projector beam, and a ratio of 0.25 a distribution with more spill light and soft beam to field transition. The light distributions depicted in the charts in FIG. 8 include 800 the beam of narrow optic FIG. 5 with a distribution of 10 deg, 801 the beam distribution of 25 deg from the optical structure of the open light flow optic shown in FIGS. 6 and 802 the beam distribution of the 50 deg optic shown in FIG. 7. The field distributions of the three classes of optics are 20 deg 803 narrow beam optic from FIG. 5, 50 deg the field of medium optic FIGS. 6, and 75 deg the field of the novel wide flood optic disclosed in FIG. 7. The ratio of beam/field of the three optics are 0.5, 0.5, and 0.75 respectively for the narrow, medium, and wide.

Figure 9:
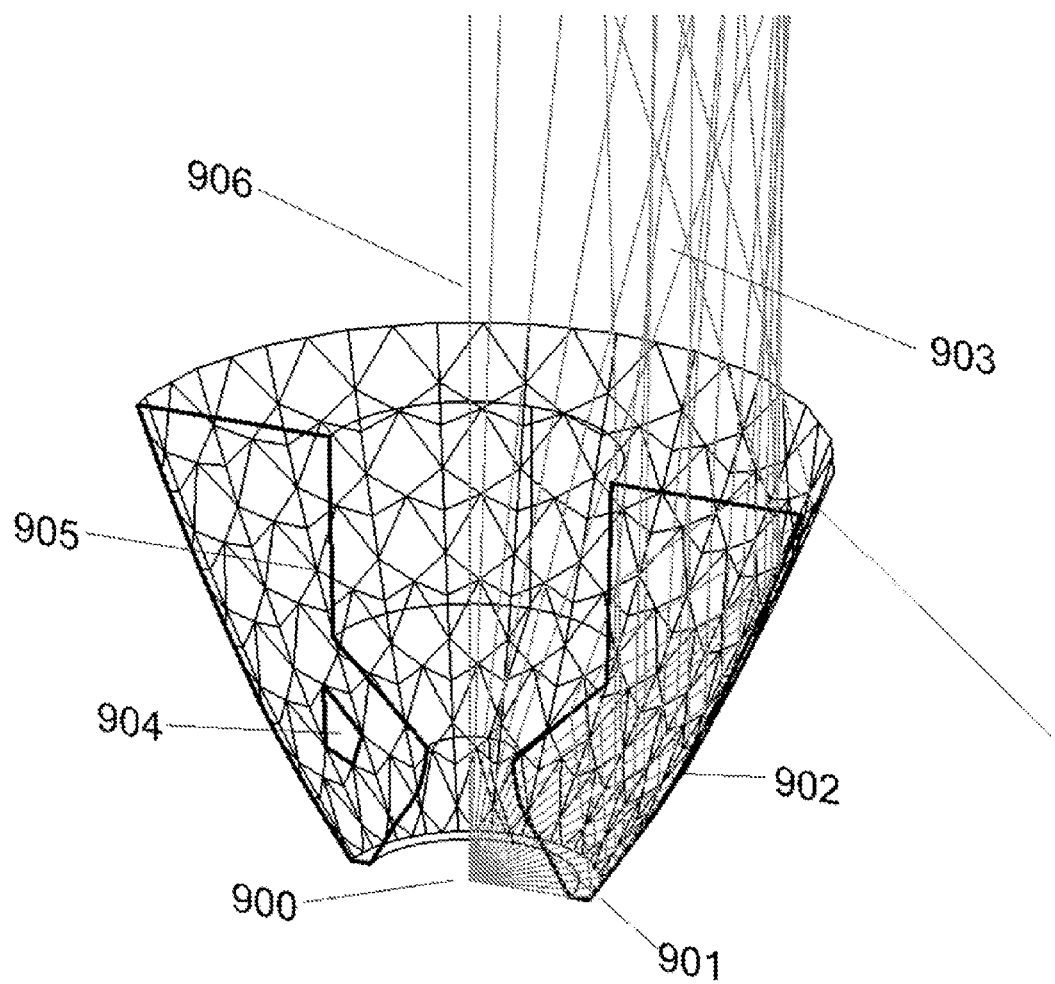
FIG. 9 illustrates a faceted open light flow narrow beam optic.

FIG. 9 shows the faceted modifiers which may be applied to the open light flow optical architectures embodied in FIGS. 4 and 5, or the medium and wide optics of FIGS. 6 and 7 as well. The light source 900 is converted by means of refractor surface 901, TIR surface 902 and may be modified by facet surface 904. The facets cut into the smooth spline revolved structure and the flat faces produce micro-aberrations into the collimation function of the classical confocal parabolic concentrator to produce higher homogeneity in the field. The 905 open light flow feature allows the light fields depicted by 906 to pass unperturbed and when combined with the controlled light fields 903 produces a high uniformity beam without the lossy flat exit face lenslets of prior designs.

Figure 10:
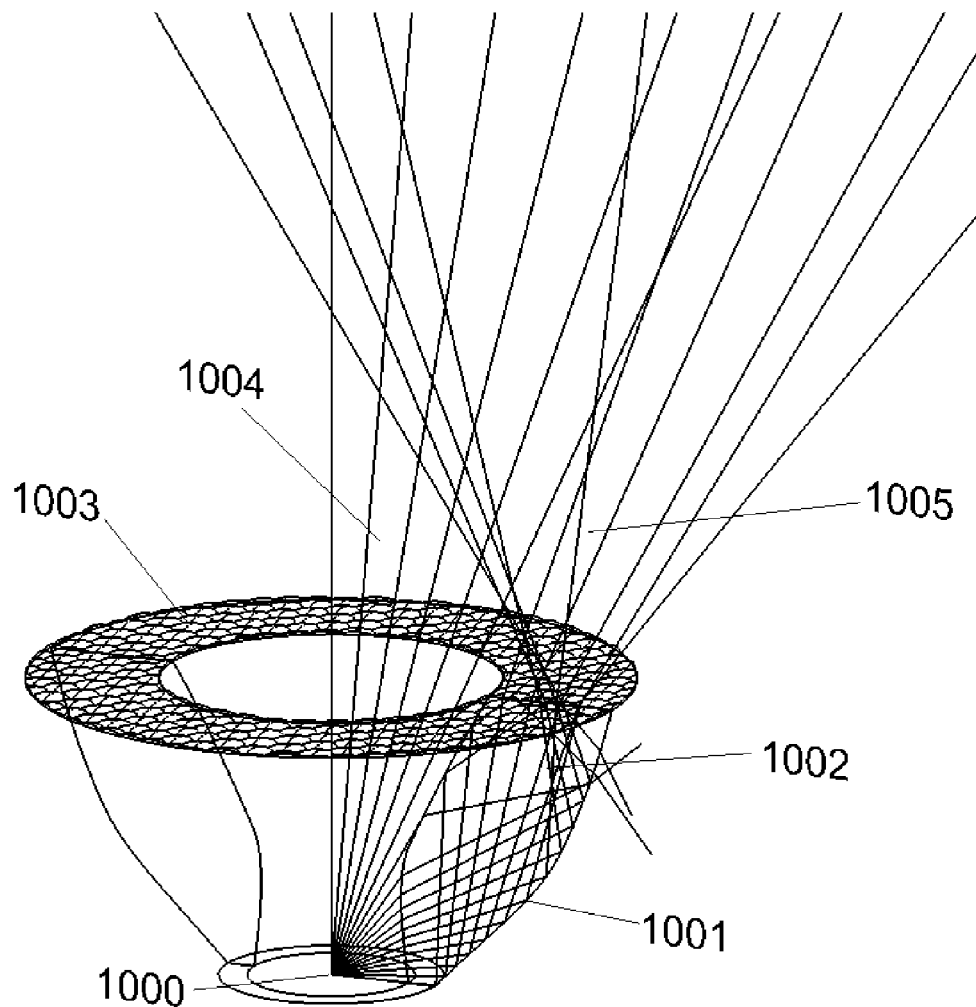
FIG. 10 illustrates a high efficiency wide beam light flow optic lenslet diffuser.

FIG. 10 depicts the wide flood open light flow optic of FIG. 7 with the addition of a micro-lenslet array applied to the flat exit surface 1003. Solid-state light source 1000 produces light which passes through the transparent section of the collimator where it is directed upward by means of surface 1001. A caustic formed at zone 1002 become a secondary source which is homogenized by means of an array of small lenslets 1003. Lenslets have convex radius of curvature relative to the flat face of the optic to distort the light fields impinging on the features thereby creating higher uniformity light 1005 which mixes with the light 1004 which passed through the optic. The advantage of partial lenslet diffusion is the net efficiency produced as the lenslets required are smaller resulting in less back-ward light reflection.

Figure 11:
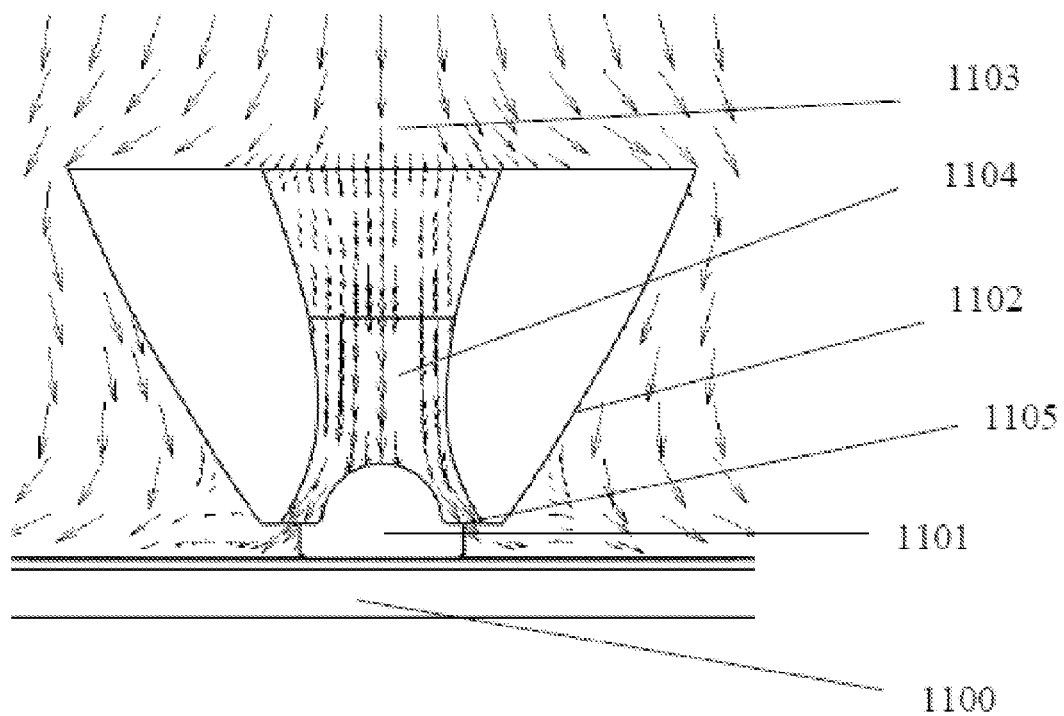
FIG. 11 illustrates a thermal vector air flow through open light flow optic.

FIG. 11 depicts the air flow 1103 which passes through the open light flow feature 1104 before exiting through outlets 1105 on either side of the light emitting diode (LED). The TIR surface 1102 collimates light from the light source 1101, which is affixed to a metal core printed circuit board 1100. The magnitude of the air flow vectors represents thermal flux/unit area. Any air flow, although restricted is good for cooling the solid-state lighting source. The combination of not just air flow, but open light flow and associated design features results in a higher efficiency optic >95% typical with this embodiment.

Figure 12:
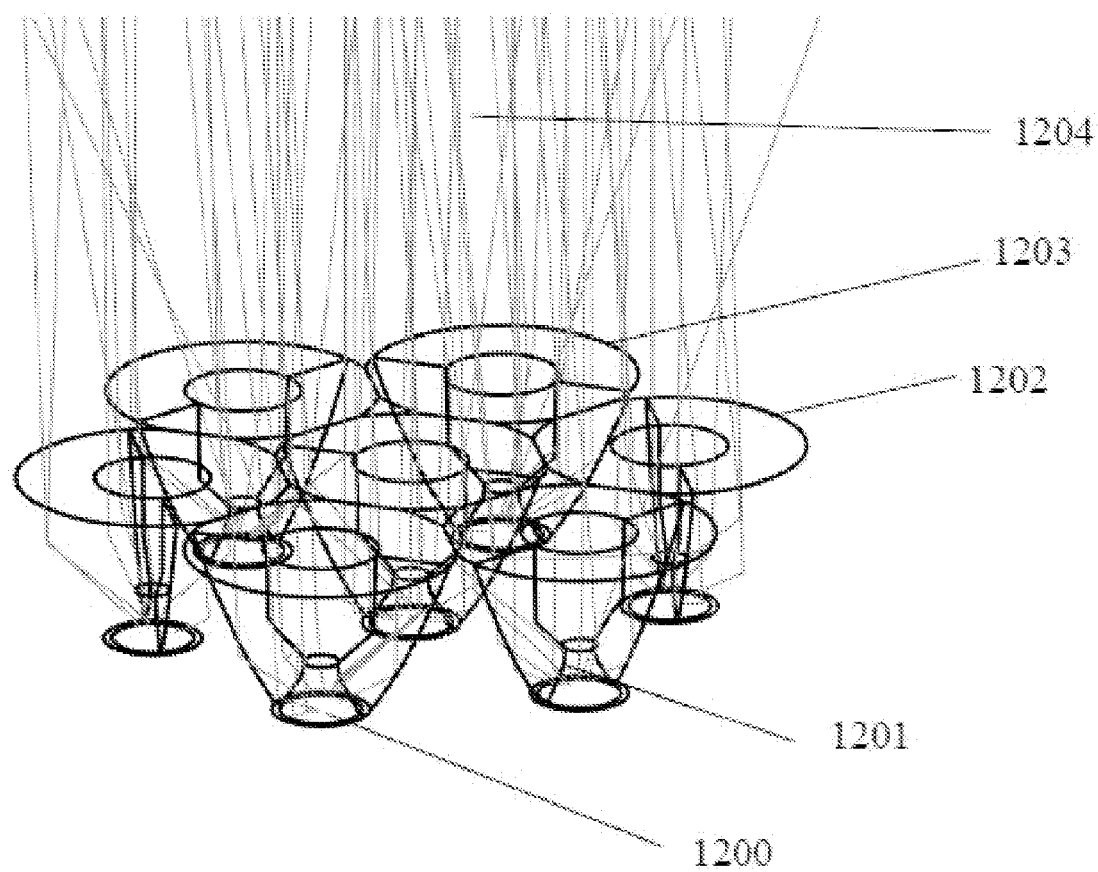
FIG. 12 illustrates a narrow light flow optic array.

FIG. 12 shows an array of narrow-beam open light flow optics 1202, 1203. The 7-cell array allows for illumination multiplexing of the scale of light from 100 lumens to 100 klumens. The light emerging from light sources 1200 are refracted by surface 1201, which conditions more of the light which would be pass uncontrolled by a simple aluminum reflector of limited height. The resulting light field 1204 is a 10 deg beam with high efficiency >93%, with far less material volume than the solid prior art tulip design of FIG. 1. Mold cycle times of the FIG. 12 array are lower, and the material cost reduced.

Figure 13:
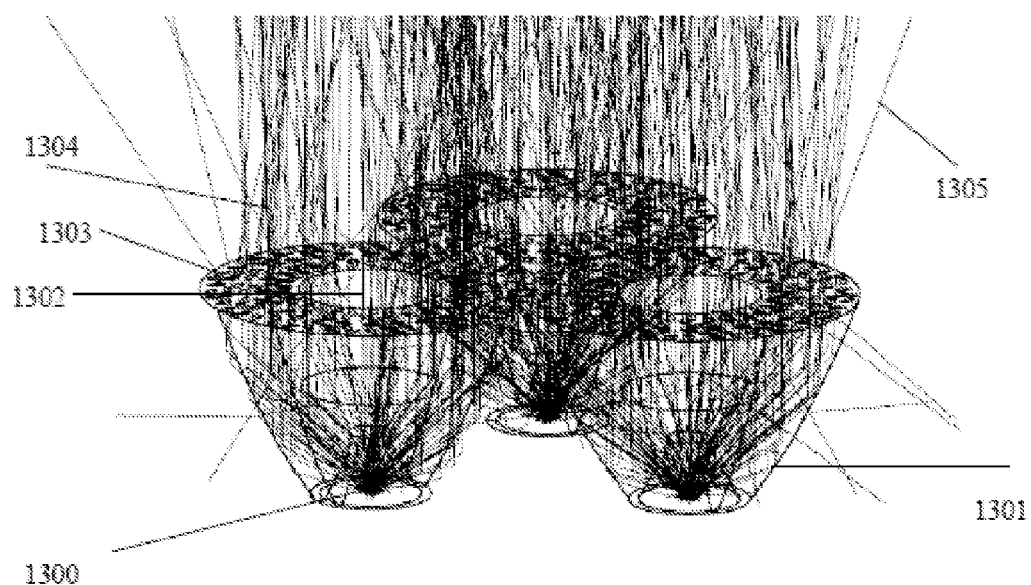
FIG. 13 illustrates a raytrace of a three-cell narrow light flow optic array with micro-texture pattern.

FIG. 13 represents the light flow ray paths through a three-cell open light flow (OLF) optic in which the three cells are joined in the center to make the overall cluster smaller in diameter. 1300 represents the solid-state light source such as a white LED or light emitting diode. 1301 represents the curvature of the TIR or total internally reflecting wall which collimates the light which hits the dielectric/air interface. 1302 indicates the open air flow channel which passes through the center of each optic cell. 1303 points to a micro-scattering pattern which perturbs the ray-path to mix and to homogenize brighter spots of light into a smooth pattern. 1304 points to a bundle of un-perturbed rays which have passed through the optic without hitting a scatter-pattern, and remain highly collimated. Ray 1305 is a ray which has been perturbed or bent by a micro-scattering pattern on the top surface of the optic.

Figure 14:
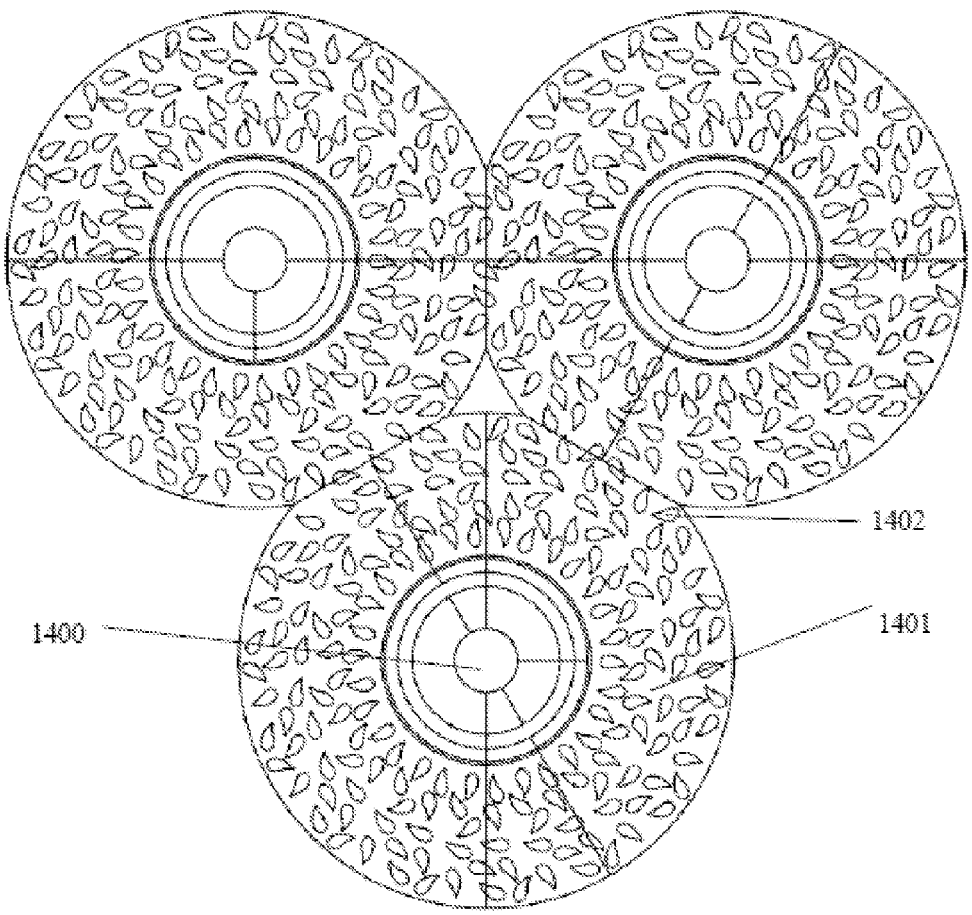
FIG. 14 illustrates a three-cell narrow light flow optic array top view of micro texture leaf pattern.

FIG. 14 depicts the top surface of the three-cell cluster which clearly shows the open air flow light paths through the center of each cell (1400). This is the channel through which both air and light may flow without back-reflection by means of Fresnel scatter. 1401 indicates the small spaces on the upper surface of the optic which do not scatter light. 1402 indicates a micro-scattering pattern or "leaf" which takes collimated light which hits the pattern area and then expands the flow into a bloom of light thereby producing higher homogenization. The combination of the scatter patterns with areas of no micro-texture results in a fine-tuning of the distribution of the light at the beam and field.

Figure 15:
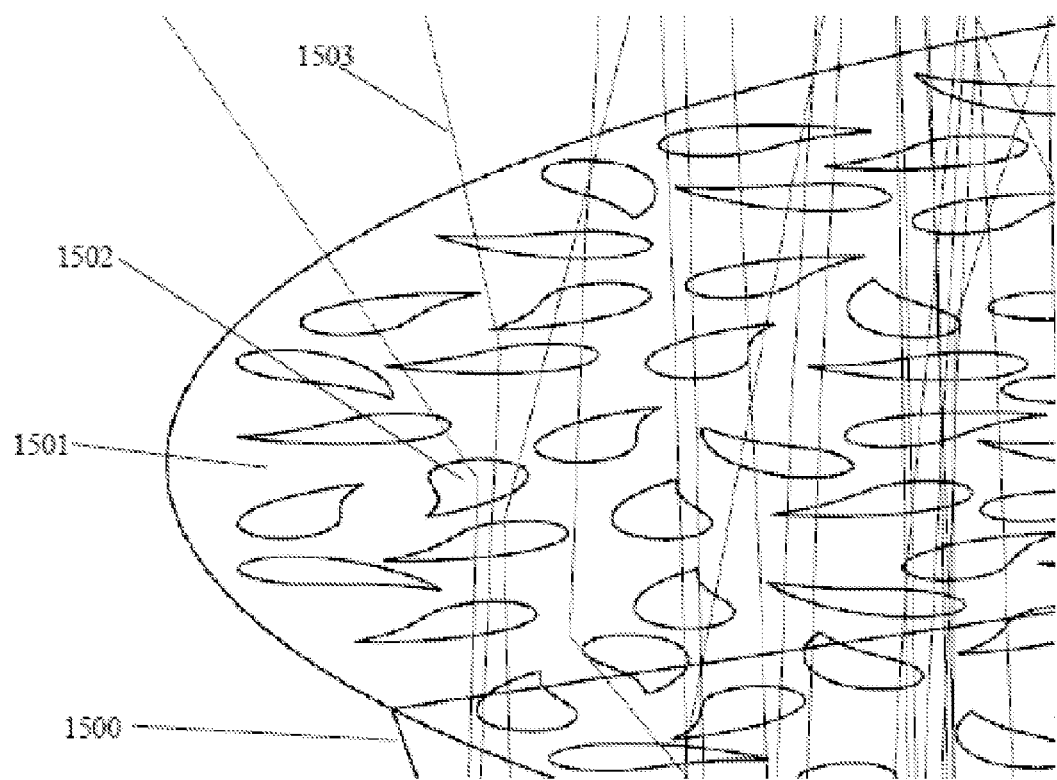
FIG. 15 illustrates a three-cell narrow light flow optic array raytrace depicting scatter function of light upon hitting a single micro-texture leaf.

FIG. 15 1500 is the TIR wall of the optic which produces collimation of the light which strikes upon it. 1501 is a magnified view of the flat areas on the top surface of the optic which have high polish and dielectric/air transfer efficiency. 1502 indicates a magnified view of one of the many micro-scattering "leaves" or patterns of scattering features. Finally, 1503 is a ray which has been perturbed by means of a micro-scattering leaf. Although the patterns shown are on the top-surface of the optic on a flat surface this is not necessary for the invention to function. The top surface may have both concave or convex curvature and incorporate micro-scattering leaves. The primary advantage of utilizing a pattern of micro-scattering leaves is higher efficiency, approximately 4% higher than what would be achieved when using an array of micro-lenslets over the entire surface to homogenize the light.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. An optical collimator comprising:
   a light control surface;
   a refractive optical control surface;
   a total internally reflecting surface (TIR);
   a transparent dielectric material ; and an exit face;

an open light flow feature that allows light within a restricted distribution zone to pass uninhibited through a core of the collimator;

a central intensity distribution of the light produced by the solid-state light source;

light emerges unimpeded through the open light flow feature;

light produced laterally from a solid-state light source is controlled and collimated by means of the TIR surface; and the resulting light beam disperses uniformly to cover the majority of the light energy producing high intensity light;

light produced by the solid-state light source refracts into a light guide section before being controlled by TIR surface;

the TIR surface performs two functions, both collimating light as well as inwardly directing light for control by means of the light control surface; and the light control surface provides secondary control upon light directed upward and inward by means of the TIR surface.

2. The optical collimator of claim 1, wherein the light source produces a Lambertian distribution which is controlled by the refractive optical control surface.

3. The optical collimator of claim 2, wherein a central zone of light from 0-5 degrees passes unimpeded through the open light flow feature;

light from 6-10 degrees inwardly refracts by means of the light control surface before undergoing TIR reflection upward by means of the TIR surface; and the exiting light emerging by means of control via the TIR surface is collimated to a high degree 5-10 degree beam, or more weakly collimated to a 25-40 degree medium flood.

4. The optical collimator of claim 1, wherein the transparent dielectric materials used include pmma, polycarbonate, silicone, or glass.

5. The optical collimator of claim 1, wherein the light control surface is used to pull light back into the transparent dielectric material for collimation.

6. The optical collimator of claim 1, wherein the TIR surface is either a straight section, a complex curvature, or discrete sections of variable slope.

7. The optical collimator of claim 1, wherein the light source is first collimated laterally by the refractive optical control surface before collimation by means of the TIR surface;

the TIR surface further comprised of a secondary TIR spline controlling the light;

the open light flow feature allows light to pass unimpeded by Fresnel back reflection or by lenslet diffusers; and the two resultant light beams which emerge by first passing through the open light flow feature and the second by means of a TIR/refractor combination produce pleasing Gaussian intensity distribution free of striations and artifacts while using far less dielectric material.

8. The optical collimator of claim 1, comprising a 50 degree open light flow optical collimator which transforms light from a Lambertian distribution source into a wide flood at high efficiency >94%;

the open light flow (OLF) optic utilizes the following light control surface to accomplish wide flood collimation including a refractor surface which transforms light within the 50-90degree zones into laterally collimated light which strikes TIR control surface;

an intermediate caustic is produced which represents in some features a CEC or confocal elliptic concentrator with a 45 degree tilt from a reference ray emerging upward from source with a directional vector of xyz [0,0,1]; and light flow through the open light flow feature continues unimpeded by a convex collimator, a lossy dielectric material, and a lenslet diffuser.

9. The optical collimator of claim 1, comprising one or more faceted modifiers;

the TIR further comprised of a smooth spline revolved structure and one or more flat faces:

the light source is converted by means of the refractive optical control surface, the TIR surface, and is modified by the faceted modifiers;

the faceted modifiers cut into the smooth spline revolved structure and the one or more flat faces produce micro-aberrations into the collimation function of classical confocal parabolic concentrator to produce higher homogeneity in a light field; and the open light flow feature allows the light fields depicted by to pass unperturbed and when combined with controlled light fields produces a high uniformity beam without lossy flat exit face lenslets of prior designs.

10. The optical collimator of claim 1, wherein the exit face is flat;

a micro-lenslet array is applied to the flat exit face;

a solid-state light source produces light which passes through the transparent dielectric material of the collimator where it is directed upward by means of the TIR surface;

a caustic formed at a zone of the transparent dielectric material becomes a secondary source which is homogenized by means of an array of small lenslets of the micro-lenslet array; and lenslets have convex radius of curvature relative to the flat exit face of the optic to distort the light fields impinging on the features thereby creating higher uniformity light which mixes with the light which passed through the optic.

11. The optical collimator of claim 1, wherein air flow passes through the open light flow feature before exiting through outlets on either side of the solid-state light source ; and the TIR surface collimates light from the light source, which is affixed to a metal core printed circuit board.

12. The optical collimator of claim 1, further comprising an array of narrow-beam open light flow optics;

a 7-cell array allows for illumination multiplexing of the scale of light from 100 lumens to 100 klumens;

the light emerging from light sources are refracted by surface, which conditions more of the light which would be pass uncontrolled by a simple aluminum reflector of limited height; and the resulting light field is a 10 degree beam with high efficiency >93%.

13. The optical collimator of claim 1, further comprising a three-cell open light flow (OLF) optic in which three cells are joined in a cluster center to make an overall cluster smaller in diameter;

curvature of the TIR or total internally reflecting surface collimates the light which hits dielectric/air interface; and an open air flow channel defined as the open light flow feature passes through a cell center of each optic cell.

14. The optical collimator of claim 13, further comprising a combination of one or more scatter patterns with areas of no micro-texture on the upper surface of the three-cell open light flow (OLF) optic cluster.

15. The optical collimator of claim 14, wherein
the upper surface of the three-cell open light flow (OLF) cluster defines the open air flow light channels through the center of each cell;
this is the channel through which both air and light flow without back-reflection by means of Fresnel scatter; and
areas of no micro-texture on the upper surface of the three-cell open light flow (OLF) optic cluster which do not scatter light.

16. The optical collimator of claim 15, wherein the TIR surface of the optic produces collimation of the light which strikes upon it.

17. The optical collimator of claim 16, wherein flat areas on the upper surface of the three-cell open light flow (OLF) optic cluster have a plurality of micro-scattering "leaves" or the scatter patterns.

18. The optical collimator of claim 17, wherein the upper surface of the three-cell open light flow (OLF) optic cluster has both a concave and convex curvature incorporate into the micro-scattering leaves.

* * * * *